July 23, 1940.  A. L. PARKER  2,209,134
VALVE ASSEMBLY
Filed June 20, 1938
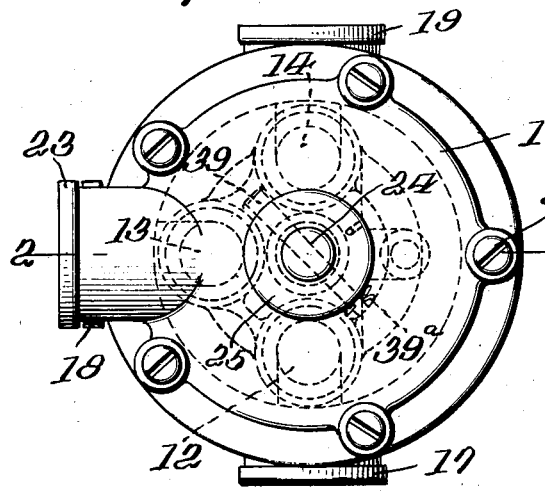
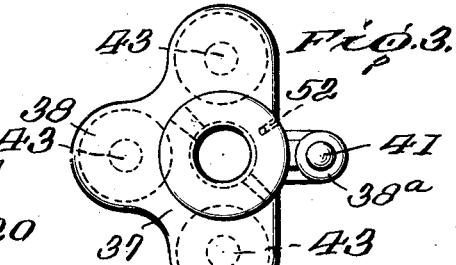
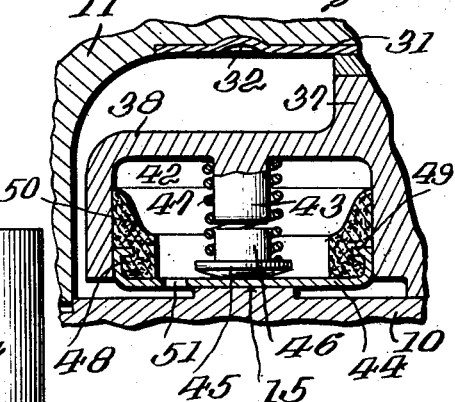
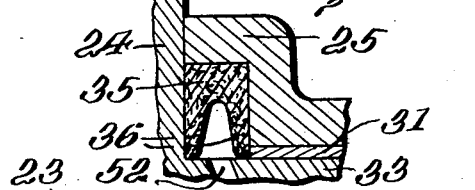
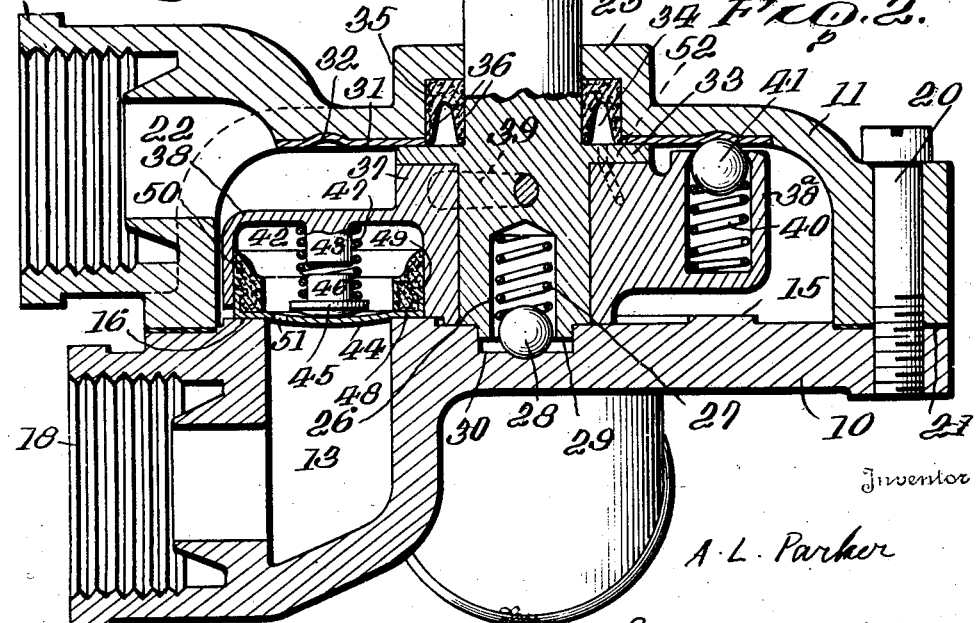
Inventor
A. L. Parker
Mason + Porter
Attorneys Patented July 23, 1940

2,209,134

UNITED STATES PATENT OFFICE 2,209,134

VALVE ASSEMBLY

Arthur L. Parker, Cleveland, Ohio

Application June 20, 1938, Serial No. 214,756

12 Claims. (Cl. 251—84)

The present invention relates to new and useful improvements in a valve assembly for controlling the passage of fluid, and more particularly to improvements in a valve assembly of the general type shown and described in Letters Patent No. 2,075,458, granted to me on March 20, 1937, and in my co-pending application, Ser. No. 196,537, filed March 17, 1938.

In the above prior patent, there is shown a valve assembly which is adapted to selectively control the passage of fluid under pressure through a plurality of ports. The valve assembly is one which is particularly adapted to selectively control the passage of fluid from a series of inlet ports to a single outlet port, or vice versa. The valve assembly includes generally a body portion having a seat provided with a plurality of inlet ports, and a chambered cap which is attached to the body and which covers the seat. The cap is provided with an outlet or discharge port and a valve member is disposed within the chambered cap and is in the form of a disc rotatably mounted therein for selectively controlling the passage of fluid through the ports. The valve disc is flexible and means are provided for turning the valve disc and for flexing the same centrally of the ports in the valve seat so as to afford a tight sealing contact therewith. In my co-pending application, referred to above, the valve member is rigid and is provided with separate flexible valve inserts, each of which is adapted to close a port and to be flexed centrally thereof for effecting a tight sealing contact.

According to the present invention, the valve member is in the form of an operating member having pockets or recesses symmetrically spaced with respect to the ports in the valve body. These pockets or recesses are sealed with respect to the chamber between the cap and the valve seat and are substantially closed by flexible valve inserts which are adapted to be flexed centrally of a port when closed.

An object of the present invention is to provide a valve assembly of the above type, wherein the fluid under pressure is utilized for maintaining the port tightly sealed by the valve insert.

A further object of the invention is to provide a valve assembly of the above type, wherein increased pressure in the inlet line will effect a correspondingly increased seating pressure on the valve insert when the port is closed.

A still further object of the invention is to provide a valve assembly of the above type, wherein the fluid under pressure is directed from an inlet port to a pocket or recess at the opposite side of the valve insert when the port is closed for maintaining a tight sealing contact around the edge of the port.

A still further object of the invention is to provide a valve assembly of the above type, wherein the pocket or recess is sealed with respect to the chamber in the valve casing when the port is closed and wherein spring means are provided for supplementing the seating pressure exerted by the fluid.

The invention still further aims to provide a valve assembly wherein fluid under pressure is utilized for maintaining a tight packing seal between the valve operating stem and the valve casing.

The above and other objects of the invention will in part be obvious and will be hereinafter more fully pointed out.

In the accompanying drawing:

Figure 1 is a top plan view showing the improved valve assembly.

Figure 2 is an enlarged sectional view taken along the line 2—2 of Figure 1.

Figure 3 is a detail plan view showing the valve member.

Figure 4 is an enlarged fragmentary view, in section, showing the position of the valve when one of the ports is open.

Figure 5 is an enlarged fragmentary view, in section, showing the packing between the valve operating stem and the valve casing.

Referring more in detail to the accompanying drawing, the valve assembly, as shown in the illustrated embodiment of the invention, includes a body portion 10 and a cap 11. Thus, the cap and the body portion provide a valve casing having a chamber therein. The body portion 10 is provided with a plurality of inlet ports 12, 13, 14 which open through the face of the body. The face of the body is provided with a raised annular portion 15 which is enlarged to extend around each of the inlet ports, thus providing a seat 16 therearound. The inlet ports 12, 13, 14 communicate with internally threaded couplings 17, 18, 19, respectively, to which suitable conduits may be attached. The conduits leading from the inlet couplings may be connected to separate tanks for supplying the fluid. The cap 11 is secured to the body portion 10 by means of bolts 20 or the like. A gasket 21 is disposed between the cap and the body portion to prevent leakage of fluid. An outlet port 22 leads from the chamber between the cap and the body portion to an internally threaded coupling 23 to which an outlet pipe may be attached. This outlet pipe leads to the desired location where the fluid is to be delivered.

A valve operating stem 24 extends through an elevated portion 25 on the valve cap 11, and the lower end thereof is recessed, as at 26, for receiving a spring 27 and a ball 28. The lower end of the valve stem 24 is provided with a skirt portion 29 which seats within a recess 30 in the valve body 10. The spring-pressed ball 28 is seated at the bottom of the recess 30, and the spring 27 tends to force the valve stem 24 upwardly.

An indicator plate 31 is suitably secured to the inner top surface of the cap 11 and is provided with recesses 32 symmetrically spaced with respect to the ports in the valve body 10. The valve operating stem 24 is provided with a laterally extending flange 33 which is maintained in tight contact with the exposed face of the plate 31. The elevated portion 25 of the valve cap 11 defines an internal recess 34 surrounding the valve stem 24. An annular packing gasket 35 is disposed in the recess 34. This gasket 35 is provided with depending skirt portions 36 which define a V-shaped recess in the gasket.

A valve operating member 37 includes a hub portion through which the lower end of the operating stem 24 extends. A tapered pin 39 extends through the hub portion of the member 37 and the stem 24 and is maintained in this position by a cotter pin 39a or the like. Thus, the operating member 37 is secured to and is rotatable with the operating stem 24.

The operating member 37 is provided with radial arms 38. The number of arms 38 is the same as the number of inlet ports, and the arms are spaced about the center axis of the operating stem symmetrically with respect to the spacing of the inlet ports in the valve body 10. The operating member 37 is also provided with a radially extending indicator arm 38a which is recessed to house a spring 40 and ball 41. The spring 40 urges the ball 41 upwardly so that it will cooperate with the recesses in the indicator plate 31 to properly locate the operating member in the various positions to which it is shifted.

The radially extending arms 38 are each provided with a recess or pocket 42 opening downwardly toward the inlet ports in the valve body 10. The arms 38 are each provided with a depending centrally located stud 43 which extends downwardly toward a valve insert 44. A pressure button 45 bears against the inner face of the valve insert 44 and is provided with an upwardly extending portion 46 disposed in alignment with the depending stud 43 so that the button 45 bears centrally on the insert 44. A spring 47 surrounds the studs 43 and 46 and bears on the button 45 tending to force the same downwardly against the inner face of the valve insert 44.

Each valve insert 44 is provided with an upstanding peripheral wall portion 48, the edge of which is inturned, as at 49, to become imbedded in a sealing washer 50. The outer edge of the washer 50 and the peripheral wall portion 48 of the valve insert 44 snugly fit the inner peripheral wall of the recess or pocket 42 in each of the arms 38. The washer 50 may be of Duprene, or other suitable material, which will seal the pocket 42. Each recess 42 and each valve insert 44 are of a diameter greater than the diameter of the inlet ports so that the valve insert 44 will overlie the inlet port and be pressed tightly against the valve seat 16 surrounding each port. The central application of the pressure exerted by the spring 47 against the flexible valve insert 44 will effect a uniform flexing of the insert and a uniform seal around the edge of the closed port.

Each valve insert 44 is provided with an aperture 51 therethrough. This aperture is disposed so that communication will be afforded between the pocket 42 and an inlet port when the port is closed. Thus, the fluid under pressure in the inlet line will flow through the opening 51 into the recess or pocket 42. Since the area against which the fluid under pressure can exert a downward pressure on the valve insert 44 is greater than the area against which the fluid in the inlet port exerts an upward or opening pressure, the fluid under pressure within the pocket 42 will exert a seating pressure on the valve insert 44. The spring-pressed button 45 also constantly exerts a seating pressure on the valve insert 44 which is flexible, as shown in Figure 2, so that a tight sealing contact will be maintained around the edge of each inlet port when closed. Any increase in the pressure in the inlet line will thus effect a corresponding increase in the seating pressure exerted by the fluid on the valve seat 44. The packing washer 50 will prevent fluid from escaping from the pocket 42 into the chamber in the valve casing.

A port 52 extends through the valve operating member 37 and the flange 33 on the operating stem 24 so as to afford communication between the chamber in the valve casing and the recess 34 between the skirt portions 36 of the packing gasket 35. When the valve operating member 37 is shifted so as to open one or more of the inlet ports, the valve insert 44 will be shifted away from the port to be opened and will ride over the elevated annular seat portion 15, as shown in Figure 4. Thus, the fluid under pressure will flow from the opened inlet port into the chamber in the valve casing and out through the discharge port 22 in the cap 11. A portion of the fluid under pressure within the valve casing will be directed through the port or passage 52 into the recess between the skirt portions 36 on the packing gasket 35. The fluid pressure will tend to force the skirt portions of the gasket 35 into tight contact with the stem 24 and with the cap 11, thus sealing the valve casing and preventing the escape of fluid past the valve operating stem.

From the foregoing description, it will be seen that an efficient valve assembly is herewith provided. The valve assembly is designed to selectively control the passage of fluid from one or more inlet ports to a single outlet port, or vice versa. A suitable handle may be provided on the operating stem 24 for rotating the same. Rotation of the stem 24 will effect corresponding rotation of the operating member 37 so that one or more of the inlet ports may be opened. When the flexible valve inserts 44 overlie the inlet ports for closing the same, the inserts are flexed centrally into the ports in order to effect a tight seal therearound, as illustrated in Figure 2. The spring-pressed button 45 is disposed centrally of each valve insert so that the valve inserts will be flexed centrally of the ports. The spring-pressed button also serves to prevent sudden pressure in the inlet ports from jamming the valve inserts into the pockets 42. Fluid in the inlet ports will pass through the apertures 51 in the valve inserts so that the pressure of the fluid will exert a downward seating pressure on the inserts. The spring-pressed ball 28 operates to maintain the flange 33 on the operating stem 24 in tight contact with the exposed face of the indicator plate 31, thus providing compensation for wearing of the parts.

The packing gasket 35 maintains the valve casing tightly sealed around the operating stem by means of fluid pressure in the valve casing. Thus, adjustment of the packing is unnecessary.

It is to be clearly understood that various changes in the details of construction and arrangement of parts may be made without departing from the scope of the invention as set forth in the appended claims.

I claim:

1. A valve assembly for controlling the passage of fluid under pressure, comprising a valve body having a seat provided with a plurality of inlet ports, a chambered cap secured to said body and covering said seat and having an outlet port leading therefrom, a valve operating member rotatably mounted between said cap and said body, said operating member having a plurality of radially extending arms symmetrically spaced with respect to said inlet ports, each of said arms being shaped to provide a pocket opening downwardly toward said body, a plurality of flexible valve inserts, one disposed across each of said pockets overlying the seat around each of said inlet ports and movable with said operating member for closing said ports, spring means associated with each of said arms and bearing centrally against each of said valve inserts for flexing the same centrally of an inlet port to be closed whereby to effect a tight sealing contact with the seat around each port, and means providing a passage for directing fluid under pressure from each of said inlet ports when closed to the pocket above the closed port whereby the fluid will exert a seating pressure on the valve insert.

2. A valve assembly for controlling the passage of fluid under pressure, comprising a valve body having a seat provided with a plurality of inlet ports, a chambered cap secured to said body and covering said seat and having an outlet port leading therefrom, a valve operating member rotatably mounted between said cap and said body, said operating member having a plurality of radially extending arms symmetrically spaced with respect to said inlet ports, each of said arms being shaped to provide a pocket opening downwardly toward said body, a plurality of flexible valve inserts, one disposed across each of said pockets overlying the seat around each of said inlet ports and movable with said operating member for closing said ports, spring means associated with each of said arms and bearing centrally against each of said valve inserts for flexing the same centrally of an inlet port to be closed whereby to effect a tight sealing contact with the seat around each port, and each of said inserts having an aperture therethrough for permitting fluid under pressure to pass directly from an inlet port when closed to the pocket thereabove whereby the fluid will exert a seating pressure on the insert.

3. A valve assembly for controlling the passage of fluid under pressure, comprising a valve body having a seat provided with a plurality of ports, a chambered cap secured to said body and covering said seat and having an outlet port leading therefrom, a valve operating stem extending through said cap and mounted for rotation, said stem having a lateral flange bearing against the inner surface of said cap, a valve operating member including a hub portion surrounding and secured to said stem below said flange, said operating member having a plurality of radially extending arms symmetrically spaced with respect to said inlet ports, each of said arms being shaped to provide a pocket opening downwardly toward said body, a plurality of flexible valve inserts, one disposed across each of said pockets overlying the seat around each of said inlet ports and movable with said operating member for closing said ports, means providing a passage for directing fluid under pressure from each of said inlet ports when closed to the pocket above the closed port whereby the fluid will exert a seating pressure on the valve insert, a packing gasket disposed between said stem and said cap and located above the lateral flange on said stem, and conduit means extending through said valve operating member and said lateral flange for directing fluid under pressure from the chamber between said cap and said body when one or more of the inlet ports are opened into contact with said packing gasket for expanding the same into tight sealing contact with the stem and the cap.

4. A valve assembly for controlling the passage of fluid under pressure, comprising a valve body having a seat provided with a plurality of inlet ports, a chambered cap secured to said body and covering said seat and having an outlet port leading therefrom, a valve operating member rotatably mounted between said cap and said body, said operating member having a plurality of radially extending arms symmetrically spaced with respect to said inlet ports, each of said arms being shaped to provide a pocket opening downwardly toward said body, a plurality of flexible valve inserts, one disposed across each of said pockets overlying the seat around each of said inlet ports and movable with said operating member for closing said ports, sealing means disposed within each of said pockets for preventing the escape of fluid under pressure therefrom when the ports are closed, spring means associated with each of said arms and bearing centrally against each of said valve inserts for flexing the same centrally of an inlet port to be closed whereby to effect a tight sealing contact with the seat around each port, and means providing a passage for directing fluid under pressure from each of said inlet ports when closed to the pocket above the closed port whereby the fluid will exert a seating pressure on the valve insert.

5. A valve assembly for controlling the passage of fluid under pressure, comprising a valve body having a seat provided with a plurality of inlet ports, a chambered cap secured to said body and covering said seat and having an outlet port leading therefrom, an indicator plate secured to the inner face of said cap and having spaced recesses therein, a valve operating member rotatably mounted between said cap and said body, said operating member having a plurality of radially extending arms symmetrically spaced with respect to the inlet ports and said recesses, each of said arms being shaped to provide a pocket opening downwardly toward said body, a plurality of flexible valve inserts, one disposed across each of said pockets overlying the seat around each of said inlet ports and movable with said operating member for closing said ports, means providing a passage for directing fluid under pressure from each of said inlet ports when closed to the pocket above the closed port whereby the fluid will exert a seating pressure on the valve insert, and an indicator arm extending outwardly from said valve operating member and carrying a spring-pressed ball adapted to cooperate with the recesses in said indicator plate for properly positioning the operating member and the valve inserts which are movable therewith.

6. A valve assembly for controlling the passage of fluid under pressure, comprising a valve body having a seat provided with an inlet port, a chambered cap secured to said body and covering said seat and having an outlet port leading therefrom, a valve operating member rotatably mounted between said cap and said body and having a radially extending arm, said arm being shaped to provide a pocket opening downwardly toward said body and adapted to overlie the port when closed, a valve insert disposed across said pocket and movable with said valve operating member for overlying the seat around the inlet port when closed, sealing means between the valve insert and said pocket for preventing leakage of fluid into the space between the valve body and the cap, and means providing a passage for directing fluid under pressure from the inlet port when closed into the pocket whereby the fluid will exert a seating pressure on the valve insert.

7. A valve assembly for controlling the passage of fluid under pressure, comprising a valve casing having a port therethrough, a valve operating member mounted within said casing and having a pocket opening downwardly and overlying and concentric with the port when closed, a flexible valve insert of a diameter greater than the diameter of the port and disposed across said pocket and movable with said valve operating member for overlying the port when closed, spring means disposed centrally of said pocket and bearing centrally against said insert for exerting a uniform flexing and seating pressure on the insert, and means providing a passage for directing fluid under pressure to said pocket when the port is closed whereby to also exert a uniform flexing and seating pressure on the insert.

8. A valve assembly for controlling the passage of fluid under pressure, comprising a valve casing having a port therethrough, a rotatable valve operating member mounted within said casing and having a pocket opening downwardly toward the port and concentric therewith and adapted to overlie the port when closed, a flexible valve insert extending across said pocket and adapted to overlie the port for closing the same, spring means disposed within said pocket and bearing centrally against said insert within the edge of the port for uniformly flexing the said insert centrally of the port when closed, and means providing a passage for directing fluid under pressure through said valve insert into said pocket when the port is closed whereby to also exert a uniform seating pressure on said valve insert.

9. A valve assembly comprising a valve body having a seat provided with a plurality of ports, a chambered cap secured to said body and covering said seat and having a port leading therefrom, a rigid valve operating member rotatably mounted in contact with said seat and having separate pockets opening downwardly toward said seat and spaced symmetrically with respect to the ports in said seat, said pockets being disposed centrally of the ports in said valve seat and overlying the said ports when closed, a plurality of flexible valve inserts, one disposed across each of said pockets and overlying each of the ports in said valve seat and movable with said operating member for closing the ports, spring means disposed within each of said pockets and bearing centrally against each of said valve inserts for uniformly flexing the said inserts centrally of a port to be closed, and means providing a passage for directing fluid under pressure from each of the ports in said valve seat when closed to the pocket above the closed port whereby to exert a uniform flexing and seating pressure on the valve insert.

10. A valve assembly for controlling the passage of fluid under pressure, comprising a valve casing, a rotatable valve operating member mounted within said casing, said casing having a flat seating surface disposed in a plane perpendicular to the axis of rotation of said valve operating member and provided with a port therethrough, a valve insert mounted radially of said valve operating member and movable therewith over the flat seating surface and having one face thereof adapted to overlie the port for closing the same, and means providing a passage for directing fluid against the opposite face of said valve insert when the port is closed whereby to exert a seating pressure thereon.

11. A valve assembly for controlling the passage of fluid under pressure, comprising a valve casing, a rotatable valve operating member mounted within said casing, said casing having a flat seating surface disposed in a plane perpendicular to the axis of rotation of said valve operating member and provided with a port therethrough, said valve operating member having a pocket mounted radially thereof and opening downwardly toward the flat seating surface and adapted to overlie the port when closed, a valve insert extending across said pocket and movable with said valve operating member over the flat seating surface and adapted to overlie the port for closing the same, and means providing a passage for directing fluid under pressure into said pocket when the port is closed whereby the fluid will exert a seating pressure on said valve insert.

12. A valve assembly for controlling the passage of fluid under pressure, comprising a valve casing, a rotatable valve operating member mounted within said casing, said casing having a flat seating surface disposed in a plane perpendicular to the axis of rotation of said valve operating member and provided with a port therethrough, said valve operating member having a pocket mounted radially thereof and opening downwardly toward the flat seating surface and adapted to overlie the port when closed, a valve insert extending across said pocket and movable therewith over the flat seating surface for overlying and closing the port and capable of slight relative movement in a direction parallel to the axis of rotation of said valve operating member, and means providing a passage for directing fluid under pressure into said pocket when the port is closed whereby the fluid will exert a seating pressure on said valve insert.

A. L. PARKER.